United States Patent [19]
Fairchild et al.

[11] Patent Number: 4,793,768
[45] Date of Patent: * Dec. 27, 1988

[54] SEAL AND TURBINE MOUNT

[75] Inventors: Jeffery Fairchild, Rockford; Anthony R. Smith, Roscoe; Steven Heitz, Rockford, all of Ill.

[73] Assignee: Sundstrand Corporation, Rockford, Ill.

[*] Notice: The portion of the term of this patent subsequent to Sep. 29, 2004 has been disclaimed.

[21] Appl. No.: 813,998

[22] Filed: Dec. 27, 1985

[51] Int. Cl.$^4$ .............................................. F01D 5/10
[52] U.S. Cl. ............................ 415/119; 415/170 R; 415/134; 285/9.2; 285/106; 285/108; 285/226
[58] Field of Search ............... 415/116, 219 R, 219 C, 415/109, 119, 126, 134, 135, 170 R, 174; 60/39.32, 39.511; 285/9.2, 106, 158, 226, 236

[56] References Cited

U.S. PATENT DOCUMENTS

| | | | |
|---|---|---|---|
| 2,340,437 | 2/1944 | Stoner | 415/119 |
| 2,348,833 | 5/1944 | Miller | 60/39.32 |
| 2,640,317 | 6/1953 | Fentress | 60/39.32 |
| 2,680,346 | 6/1954 | Michael | 60/39.32 |
| 3,151,894 | 10/1964 | Wilson et al. | 285/226 |
| 3,183,841 | 5/1965 | Gaynor | 415/170 R |
| 3,184,917 | 5/1965 | Caouette et al. | 239/265.33 |
| 3,241,314 | 3/1966 | Fields | 60/39.32 |
| 3,371,482 | 3/1968 | Camboulives et al. | 60/39.32 |
| 3,455,073 | 7/1969 | Kiekhaefer | 52/200 |
| 3,515,168 | 6/1970 | Tamny | 285/9.2 |
| 3,591,963 | 7/1971 | Kopp | 60/39.31 |
| 3,592,564 | 7/1971 | Conery | 285/9.2 |
| 3,721,460 | 3/1973 | Holman et al. | 285/175 |
| 3,869,222 | 3/1975 | Rahnke et al. | 415/173 R |
| 3,991,560 | 11/1970 | DeCorso et al. | 60/39.32 |
| 4,116,171 | 9/1978 | Schulmeister et al. | 415/206 |
| 4,361,296 | 11/1982 | Hall et al. | 244/54 |
| 4,422,288 | 12/1983 | Steber | 60/39.32 |
| 4,487,014 | 12/1984 | Vinciguerra | 415/219 R |
| 4,516,908 | 5/1985 | Vinciguerra | 415/219 R |
| 4,696,618 | 9/1987 | Fairchild et al. | 415/119 |

FOREIGN PATENT DOCUMENTS

| | | | |
|---|---|---|---|
| 882022 | 7/1953 | Fed. Rep. of Germany | 285/9.2 |
| 59-746 | 4/1983 | Japan | 415/121 G |
| 869455 | 5/1961 | United Kingdom | 285/9.2 |

Primary Examiner—Robert E. Garrett
Assistant Examiner—John T. Kwon
Attorney, Agent, or Firm—Wood, Dalton, Phillips, Mason & Rowe

[57] ABSTRACT

Vibration and shock isolation, as well as working fluid flow path sealing in a turbine-type power plant having a turbine housing 18 with a radially directed peripheral outlet 38 is achieved by locating the turbine housing 18 within a tubular housing 44 with a radially inwardly opening port 46 aligned with the turbine housing outlet 38 and disposing elastomeric seal and turbine mounts 50, 52 mounted on spaced side walls 28 and 30 for sealing the outlet 38 to the port 46 and to serve as engine mounts for a turbine wheel 10 and the turbine housing 18.

18 Claims, 3 Drawing Sheets

SEAL AND TURBINE MOUNT

FIELD OF THE INVENTION

This invention relates to steam turbine systems, and more particularly, to an elastomeric structure that may be used for the dual purpose of sealing a turbine exhaust duct to another structure while resiliently mounting the turbine for vibration and shock isolation.

BACKGROUND OF THE INVENTION

Various systems have been utilized to provide propulsion for torpedoes. Desirably, such systems should be quiet in operation to prevent or minimize the possibility of premature detection. Further, the system should not be depth sensitive, that is, should be capable of operating in a single, specified fashion whether located just below the surface or substantially below the surface.

Many systems that have been proposed, particularly those utilizing steam turbines, have not met the above criteria. Typically, such systems are open cycle systems where spent or exhaust steam is vented from the torpedo during its operation. Such venting not only increases the noise level of operation, but renders the torpedo sensitive to the depth at which it is running since the back pressure resisting venting will vary proportionately to depth.

To avoid these difficulties, it has been proposed to provide a closed cycle steam turbine system particularly suited as the source propulsion for torpedoes. As implied by the term "closed cycle", the working fluid, namely water, after it exhausts from the turbine as steam, is condensed and subsequently vaporized to form additional steam for driving the turbine wheel. As a consequence, the working fluid flows throughout a closed path, eliminating any need for venting the same, in turn, eliminating the source of noise associated with venting as well as sensitivity to depth.

At the same time, a closed cycle requires that the turbine exhaust be sealed to a condenser in such a way that the sealed interface will accommodate substantial thermal growth due to the temperature differential between non-operating temperature and operating temperature and withstand a severe thermal environment. To provide such a seal, as well as other necessary components such as engine mounts for the turbine with a minimum number of components, and yet provide a desired degree of reliability in operation, is a considerable task; and the present invention is directed to accomplishing that task.

SUMMARY OF THE INVENTION

It is a principal object of the invention to provide a new and improved power plant including a turbine. More specifically, it is an object of the invention to provide such a power plant including a turbine which may be ideally suited for utilization in a closed cycle steam turbine system.

An exemplary embodiment of the invention achiever the foregoing object in a power plant comprising a turbine wheel rotatable about an axis and a transmission engaged with the turbine wheel. A turbine housing surrounds the turbine wheel and has a radially directed, peripheral outlet including two axially spaced side walls. A tubular housing contains the turbine wheel, the transmission, and the turbine housing and includes a radially inwardly opening port aligned with the outlet in the turbine housing. Elastomeric means of low stiffness are mounted on the spaced side walls for (a) sealing the outlet to the port, and (b) serving as an engine mount for the turbine wheel and the turbine housing.

In a preferred embodiment, the elastomeric means include a radially outer sealing surface for engaging the tubular housing about the port and means for pressurizing the sealing surface at least in a radially outward direction.

According to one form of the invention, the pressurizing means comprises spring rings engaging the elastomeric means radially inwardly of the sealing surfaces. According to this embodiment of the invention, the elastomeric means are sheet like and include peripheral beads received in retaining formation on the walls, a radially inwardly opening groove opposite of the sealing surface and receiving the spring ring, and at least one fold or credit intermediate the bead and the groove. According to one form of this embodiment, the fold axially spaces parts of the elastomeric means while according to another form of this embodiment, the fold radially spaces parts of the elastomeric means.

According to another embodiment of the invention, the pressurizing means include pressure chambers within the elastomeric means for receiving a fluid under pressure. According to this embodiment, the elastomeric means may be provided with pressure chambers and are disposed on each of the walls with each pressure chamber being in fluid communication with at least one spray orifice directed across the turbine housing outlet at the elastomeric means on the opposite one of the walls.

This embodiment of the invention contemplates that each of the walls terminate in a peripheral mounting ring having a radially outwardly opening groove with a retaining formation in the groove walls. The elastomeric means are mounted on and retained in the grooves. In one form of the invention, the elastomeric means have a generally circular cross section with oppositely directed ridges received within the retaining formations.

According to another form of this embodiment, the elastomeric means have a generally U-shaped cross section with oppositely directed ridges received within the retaining formations.

Other objects and advantages will become apparent from the following specification taken in connection with the accompanying drawings.

DESCRIPTION OF THE PREFERRED EMBODIMENTS

Figure 1:
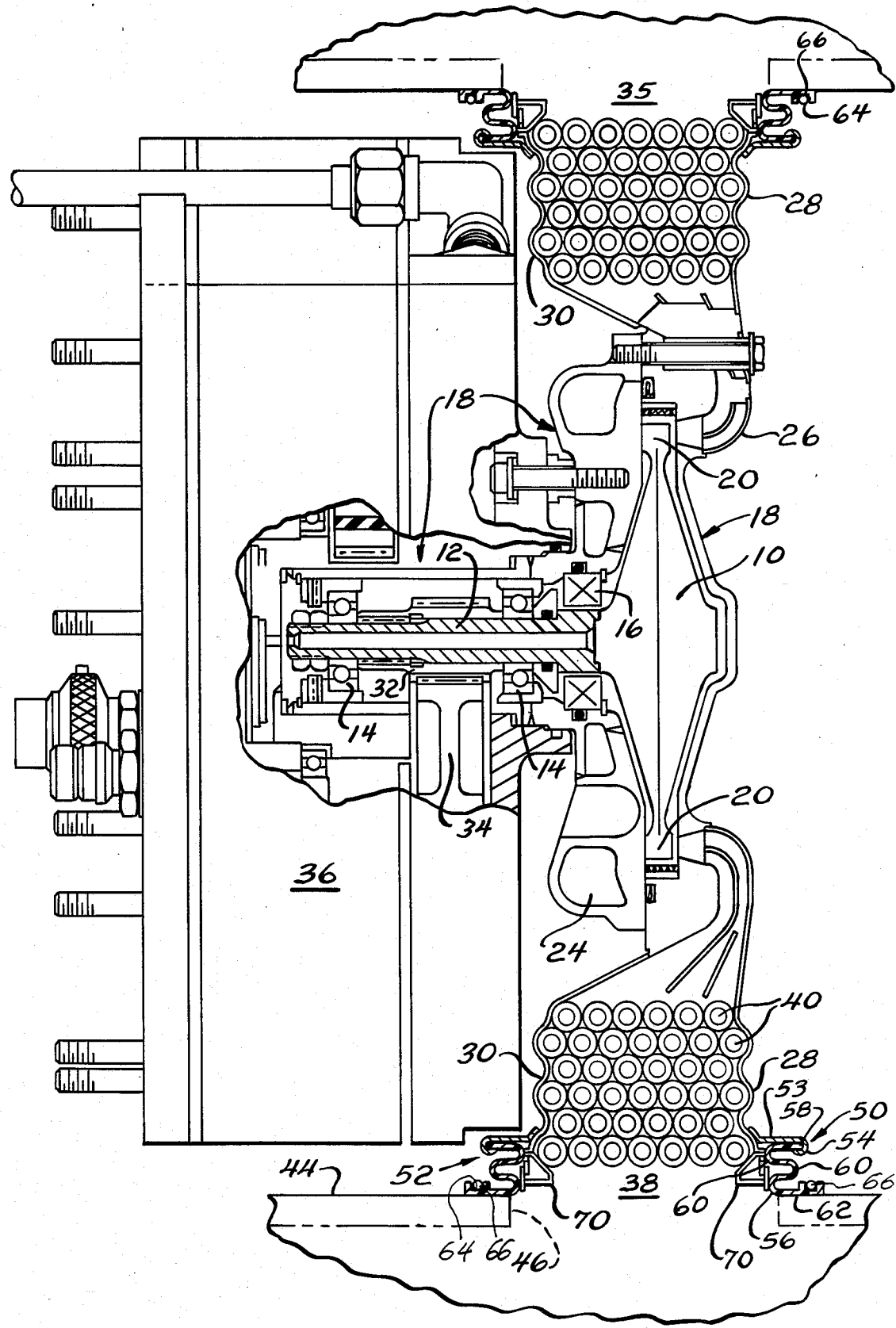
FIG. 1 is an elevational view of one embodiment of a power plant made according to the invention with parts broken away for clarity.

An exemplary embodiment of the invention is illustrated in the drawings and with reference to FIG. 1 is seen to include a turbine wheel 10 mounted on a shaft 12 journalled by bearings 14 and sealed by a seal 16 within a turbine housing 18. Near its periphery, the turbine wheel 10 includes axial flow turbine blades 20 at which steam jets (not shown) from a steam manifold 24 are directed. Axially oppositely of the manifold 24, is a channel 26 which directs the exhaust flow from the turbine wheel 10 in the radially outward direction between two axially spaced walls 28 and 30.

The shaft 12 is splined to a gear 32 which in turn is engaged with a gear 34 forming the input to a transmission 36. When used as a power plant for the torpedo, the output (not shown) from the transmission 36 will ultimately drive propellers (not shown).

The radially outer location between the walls 28 and 30, shown at 38, defines an exhaust outlet from the turbine housing 18. Just radially inwardly of the outlet 38 is a series of finned tubes 40 which may serve as a regenerator as more fully disclosed in the commonly assigned, co-pending application of Symington, Ser. No. 768,735 entitled *Regenerator with Spray Cooler*, and executed on Aug. 12, 1985, the details of which are herein incorporated by reference.

In any event, the outlet 38 will be generally, radially outwardly opening and extend peripherally about the turbine wheel 10 (in some instances, the outlet 38 may not extend about a full 360° to accommodate other components of the system in which the power plant is used).

When used in environment of a torpedo, the various components heretofore described will be contained within a tubular housing 44. The housing 44 may include a port 46 that opens radially inwardly and which is aligned with the outlet 38. The port 46 may be in fluid communication with a so called "hull condenser" in which the exhaust steam from the turbine wheel 10 is condensed prior to being reevaporated to further drive the turbine wheel 10.

It is highly desirable to isolate vibration and shock from various components of the overall system. To this end, it is desirable to provide a vibration and shock isolating engine mount for the turbine wheel 10 and its housing 18 as well as the transmission 36. It is also necessary to seal the exhaust outlet 38 of the turbine housing 18 to the condenser port 46. The present invention accomplishes both functions with a single structure.

In particular, each of the walls 28 and 30 at its radially outer extremity, is provided with a seal and turbine mount structure, generally designated 50 and 52, respectively. Inasmuch as the mount 52 is a mirror image of the mount 50, only the mount 50 will be described. Extending axially away from the wall 28 and secured thereto as by welding (not shown) or any other desired form of securement is a sleeve 53, which at its end remote from the wall, terminates in a rounded flange 54. An O-shaped bellows 56 formed of an elastomeric material of low stiffness such as Viton (TM) includes a peripheral bead 58 which is received and retained in the curve portion 54. The bellows 56 includes a number of folds or crests 60 which serve to radially space various parts of the bellows 56 which otherwise would be sheet like in order to provide flexibility. Materials other than that specifically identified above may be used. Generally they will be elastomers whose properties have been suitably chosen or adjusted for the severe thermal environment and the requisite stiffness characteristics.

Oppositely of the bead 58, the bellows 56 terminates in an annular sealing surface 62 which sealingly engages the tubular housing 44 about the port 46. Oppositely of the surface 62 is a radially inwardly opening groove 64 which in turn receives a spring ring 66 which serves to pressurize or bias the surface 62 radially outwardly and into good sealing engagement with the tubular housing 44.

If desired, axially inwardly of each of the seal and turbine mounts 50 and 52, the walls 28 and 30 may mount annular conduits 70 with spray nozzles as more fully described in the previously identified application of Symington.

Figure 2:
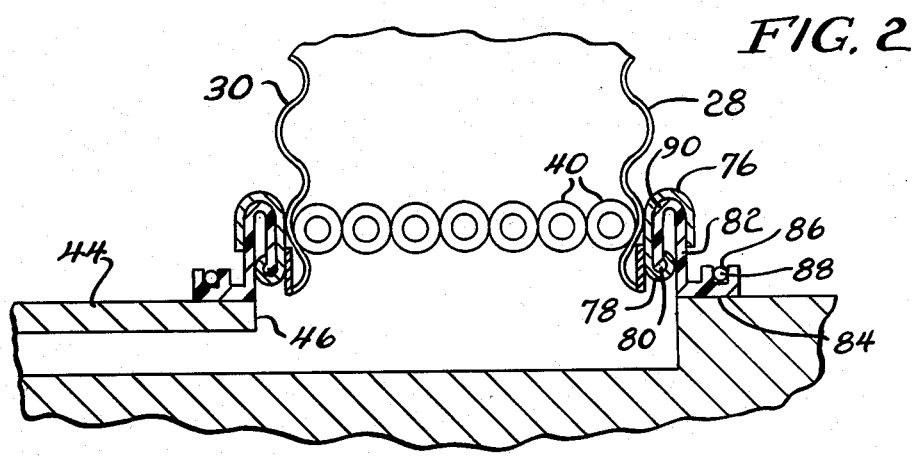
FIG. 2 is a fragmentary, sectional view of a modified embodiment of the invention.

FIG. 2 illustrates an alternative embodiment. In this embodiment, a ring 76 having an inverted hooklike configuration is utilized in lieu of the sleeve 53. The radially outer, axially inner portion of the ring 76 includes a curved retaining formation 78 for receipt of a peripheral bead 80 on a sheet-like elastomeric element 82 of low stiffness. Like the elastomeric element 56, the elastomeric element 82 is provided with a sealing surface 84 for sealing engagement with the tubular housing 44 about the port 46 and an oppositely located, radially inwardly opening groove 86 for receipt of as spring ring 88 which biases the sealing surface 84 radially outward into sealing engagement with the tubular housing 44.

At least one fold or crest 90 axially spaces different parts of tee elastomeric seal 82 to provide a flexing area.

Figure 3:
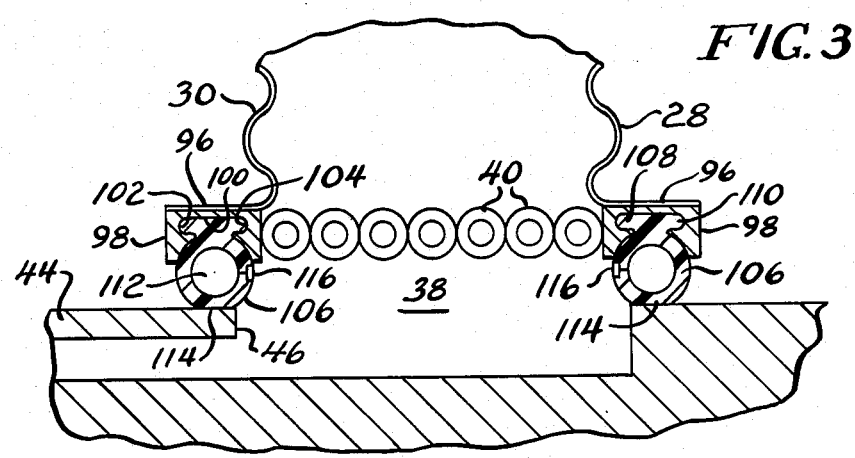
FIG. 3 is a view similar to FIG. 2, but of a further modified embodiment of the invention.

In lieu of pressurizing the sealing surface 62 or 84 into sealing engagement with the tubular housing 44 by means of a spring ring such as shown at 66 or 88, fluid under pressure may be utilized for the same purpose, and in addition, when used, may be further employed to remove any superheat from exhaust steam passing through the regenerator defined by the tubes 40 as described more fully in the previously identified Symington application as well as to cool the elastomeric means utilized to seal and mount the turbine. In this respect, FIG. 3 illustrates an embodiment where the walls 28 and 30 are provided with axially extending, peripheral flanges 96, each of which mount a mounting ring 98. Each mounting ring 98 has a radially outwardly opening groove 100 and, near its base, is provided with a retaining formation in the form of facing, axially opening grooves 102 and 104. An elastomeric means of low stiffness in the form of a tube-like ring 106 is employed. In cross section, the tube-like ring is circular and has oppositely directed, peripheral ribs 108 and 110 which are received in the retaining grooves 102 and 104 respectively.

The interior 112 of the ring acts a fluid receiving chamber for receiving fluid under pressure, which in turn acts to pressurize a sealing surface 114 on the radially outer side of each ring 106 into sealing engagement with the tubular housing 44 about the port 46.

In a preferred embodiment, the fluid utilized is water in the liquid phase, and at periodic locations around the periphery of the outlet 38, the tubes 106 have their interiors 112 in fluid communication with nozzle-like orifices 116. The orifices 116 direct the water across the outlet 38 to eliminate any superheat in the exhausting steam. In addition, the water stream is directed from each tube 106 across the outlet 38 towards the other tube 106 to impinge upon the same and thus provide a measure of cooling and heat protection for the elastomeric material of which the tubes 106 are made.

Figure 4:
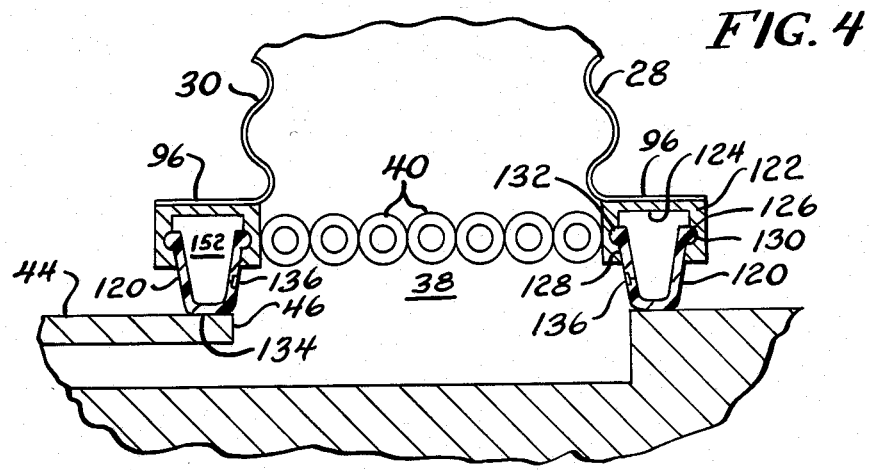
FIG. 4 is a view similar to FIGS. 2 and 3, but of still a further modified embodiment.

FIG. 4 shows still a further modified embodiment utilizing fluid under pressure. In this embodiment, sealing rings 120 of generally U-shaped cross section are employed in connection with mounting rings 122 on the flanges 96. Mounting rings 122 have radially outwardly opening groove 124 and the grooves 124, in their side walls, have axially opening, facing, retaining grooves 126 and 128 for receiving peripheral beads 130 and 132 respectively on the seal rings 120. Thus, the interior of the grooves 124 and the interiors of the seal rings 120 serve to define chambers 132 for receipt of pressurizing fluid whereby a sealing surface 134 may be biased against the tubular housing 44 about the port 46. The axially inner sides of the seal rings 120 may be provided with nozzle-like orifices 136 for the same purposes mentioned previously.

One desirable attribute of the embodiments illustrated in FIGS. 3 and 4 is the ability to control or adjust stiffness of the seals 106 and 120. This can be accomplished by suitably regulating the pressure of the water directed to the interior of the seals 106 and 120 for spraying purposes.

Figure 5:
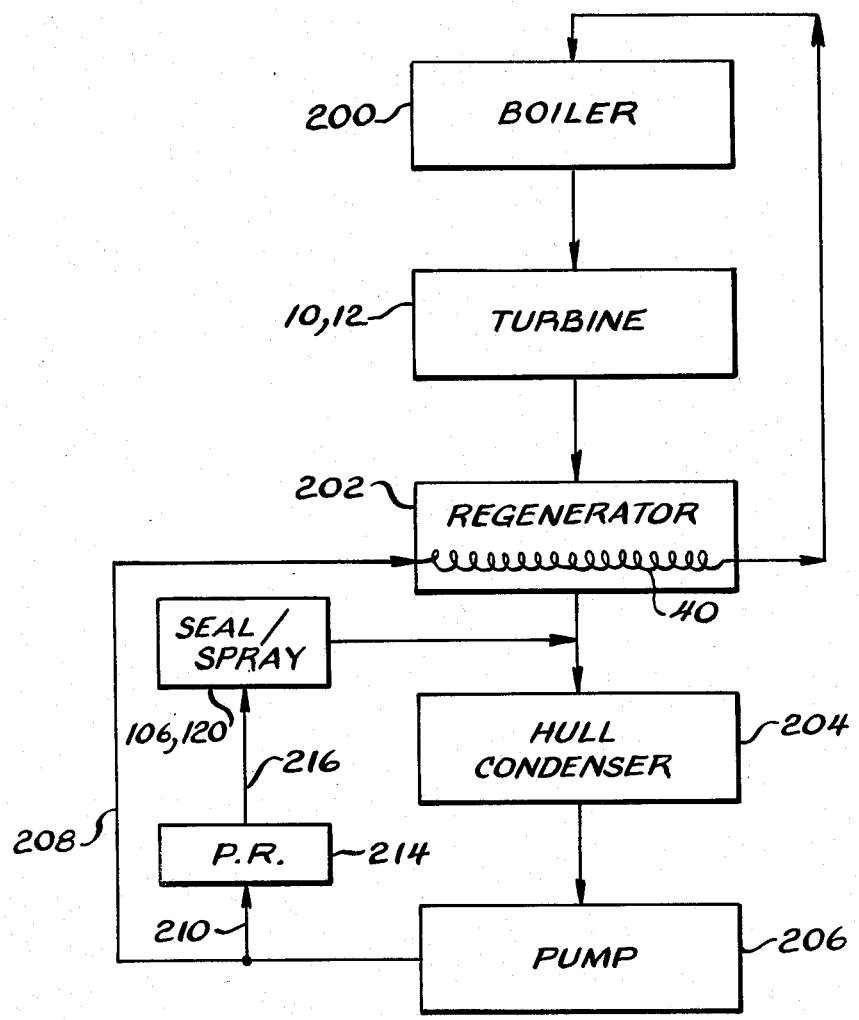
FIG. 5 is a schematic of a closed cycle system embodying one form of the invention.

FIG. 5 illustrates one embodiment for accomplishing such adjustment. The turbine previously described is illustrated 10, 18 and the same receives steam from a boiler 200. The boiler 200 receives make-up water from the finned tubes 40 which, as mentioned previously, form part of a regenerator 202. The exhaust from the turbine 10, 18 is passed through the regenerator 202 to be sprayed by water emanating from the seals 106 or 120 which remove all superheat from the steam before it is directed to a hull condenser 204 and condensed.

A pump 206 receives the condensate from the hull condenser 204 and directs the main portion of the same along a line 208 to the finned tubes 40 in the regenerator. However, a portion of the output from the pump 206 is directed along a line 210 to an adjustable pressure regulator 214 which feeds, on a line 216, the interior of the seals 106 or 120 as the case may be.

Thus, by adjusting the pressure of the fluid applied to the interior of the seals through suitable adjustment or operation of the pressure regulator 214, the total stiffness of the seals 106 or 120 can be adjusted as required to achieve desirable operating characteristics.

From the foregoing, it will be appreciated that a power plant made according to the invention is excellently suited for use in a torpedo. The elastomeric means at the turbine housing outlet not only serve to seal such outlet to a port leading to, for example, a hull condenser, but additionally serve as a low stiffness means for mounting the forward end of the turbine assembly for vibration and shock isolation within the tubular housing 44 forming part of the torpedo.

We claim:

1. A power plant comprising a turbine wheel rotatable about an axis;
   a transmission engaged with said turbine wheel;
   a turbine housing containing and journalling said turbine wheel and having a radially directed peripheral outlet including two axially spaced side walls;
   a tubular housing containing said turbine wheel, said transmission, and said turbine housing and including a radially inwardly opening port aligned with said outlet; and
   elastomeric means of low stiffness mounted on said spaced side walls for (a) sealing said outlet to said port, and (b) serving as an engine mount for mounting said turbine housing, and thus said turbine wheel, to said tubular housing.

2. The power plant of claim 1 wherein said elastomeric means includes radially outer sealing surfaces for engaging said tubular housing about said port and means for pressuring said sealing surfaces at least in the radially outward direction.

3. The power plant of claim 2 wherein said pressurizing means include a pressure chamber within said elastomeric means for receiving a fluid under pressure.

4. The power plant of claim 3 wherein an elastomeric means with a pressure chamber is disposed on each of said walls and each pressure chamber is in fluid communication with at least one spray orifice directed across said outlet at the elastomeric means on the opposite one of said walls.

5. The power plant of claim 3 wherein each of said walls terminates in a peripheral, mounting ring having a radially outwardly opening groove having a retaining formation in the groove walls thereof, and said elastomeric means are mounted and retained in said grooves.

6. The power plant of claim 5 wherein said elastomeric means have a generally circular cross section with oppositely directed ridges received within said retaining formations.

7. The power plant of claim 5 wherein said elastomeric means have a generally U-shaped cross section with oppositely directed ridges received with said retaining formations.

8. The power plant of claim 2 wherein said pressurizing means comprises spring rings engaging said elastomeric means radially inwardly of said sealing surfaces.

9. The power plant of claim 8 wherein said elastomeric means are sheet like and including peripheral bead received in a retaining formation on said walls, a radially inwardly opening groove opposite said sealing surface and receiving said spring ring, and at least one fold intermediate said bead and said groove.

10. The power plant of claim 9 wherein said fold axially spaces parts of said elastomeric means.

11. The power plant of claim 9 wherein said fold radially spaces parts of said elastomeric means.

12. The power plant of claim 1 further including means for adjusting the stiffness of said elastomeric means.

13. The power plant of claim 12 wherein said elastomeric means include radially outer sealing surfaces for engaging said tubular housing about said port and means for pressurizing said sealing surfaces at least in the radially outward direction; and said stiffness adjusting means comprises means for adjusting said pressurizing means.

14. A power plant comprising a turbine wheel rotatable about an axis;
   a transmission engaged with said turbine wheel;
   a turbine housing surrounding said turbine wheel and having a radially directed, peripheral outlet including two axially spaced side walls;
   a tubular housing containing said turbine wheel, said transmission, and said turbine housing and including a radially inwardly opening port aligned with said outlet; and
   a pair of low stiffness, elastomeric seal and turbine mounts, one on the radially outer extremity of each of said walls, sealing the associated wall about said port, each said seal and turbine mounting including a sealing surface engaging said tubular housing and a groove oppositely of said sealing surface and receiving a spring ring for biasing said sealing surface toward said tubular housing, a mounting end secured to the associated wall and an intermediate flexing section comprising at least one fold.

15. A power plant comprising a turbine wheel rotatable about an axis;
   a transmission engaged with said turbine wheel;
   a turbine housing surrounding said turbine wheel and having a radially directed, peripheral outlet including two axially spaced side walls;
   a tubular housing containing said turbine wheel, said transmission, and said turbine housing and including a radially inwardly opening port aligned with said outlet; and
   a pair of elastomeric seal and turbine mounts, one on the radially outer extremity of each of said walls and extending peripherally thereabout in sealing contact with said tubular housing about said port, each seal and turbine mount including at least one pressurizable chamber for receiving a fluid under pressure to bias the corresponding seal and turbine mount into said sealing contact.

16. The power plant of claim 15 wherein said chambers have nozzle-like outlets directed across said turbine housing outlet and at the opposite seal and turbine mount.

17. The power plant of claim 15 further including adjustable means for providing fluid under pressure to each said pressurizable chamber to thereby permit selective adjustment of the stiffness of each said elastomeric seal and turbine mount.

18. The power plant of claim 15 wherein said fluid providing means comprises a water pump and wherein said chambers have nozzle-like outlets directed across said turbine housing outlet and at the opposite seal and turbine mount.

* * * * *